Patented Sept. 3, 1946

2,406,802

UNITED STATES PATENT OFFICE 2,406,802

2-ETHYLHEXYL PHOSPHATES

Thomas F. Carruthers, South Charleston, W. Va., assignor to Carbide and Carbon Chemicals Corporation, a corporation of New York No Drawing. Application February 18, 1942, Serial No. 431,449

2 Claims. (Cl. 260—461)

This invention relates to new compositions of matter comprising tri-alkyl phosphates containing 2-ethylhexyl esterifying radicals in the molecule, and especially to tri-2-ethylhexyl phosphate.

The 2-ethylhexyl phosphates with which this invention is concerned are generally characterized by being clear or light-colored liquids of high boiling point and by being insoluble in water. Tri-2-methylhexyl phosphate is a practically water-white liquid of mild odor. It is compatible with cellulose ethers and esters, for example ethyl cellulose and nitrocellulose, and with polyvinyl resins, for instance polyvinyl esters of carboxylic and halogen acids, for instance polyvinyl acetate and polyvinyl chloride; polyvinyl acetals, for example polyvinyl butyral; and copolymerized vinyl compounds, for example copolymerized vinyl acetate and vinyl chloride.

Compositions comprising a polyvinyl resin and about 50% by weight (based on the resin) of tri-2-ethylhexyl phosphate as a plasticizer are of particular value as electrical cable coatings. These compositions have desirable combinations of such characteristics as flexibility at low temperatures and retention of the plasticizer at relatively high temperatures, good tensile strength, elasticity and resistance to sharp abrasives, and resistance to fire. Such compositions are disclosed in my copending application Serial No. 539,778, filed June 10, 1944.

The esters may be prepared in any one of several generally known esterification procedures. As an illustration, tri-2-ethylhexyl phosphate may be prepared by reacting 2-ethylhexanol-1 with phosphorus oxychloride in an inert liquid solvent, and removing, by suitable means, the hydrochloric acid formed.

Example 860 parts by weight (6.6 mols) of 2-ethylhexanol-1 and 500 parts by weight (6.0 mols) of pyridine were dissolved in 1075 parts by weight (13.8 mols) of benzene. The solution was cooled to about 5° C. and, while agitating and continuing to cool the reaction mass, 306 parts by weight (2.0 mols) of phosphorus oxychloride were slowly added. During the addition the temperature was not allowed to rise above 10° C. The excess pyridine remaining in solution was neutralized by adding hydrochloric acid and the reaction mass was allowed to stand at ordinary temperature for 12 hours. The precipitated salt which was formed was removed by filtration. The filtrate was treated with a small amount of soda ash; following this the benzene and unreacted alcohol were removed by distillation at reduced pressures. The still residue was washed with alkaline permanganate solution and then heated at 100° C. under a pressure of 3 mm. of mercury pressure, gauge. The amount of product remaining as a residue corresponded to a yield of 76% of the theoretical. This product is sufficiently pure for ordinary uses; but if desired it may be further purified by distillation. Tri-2-ethylhexyl phosphate was found to have a specific gravity of 0.924 at 20°/20° C., a boiling point of 203° C. at 3.5 mm. of mercury pressure, gauge, and a clear faintly yellow color.

The invention is susceptible of modification within the scope of the appended claims.

I claim:

1. As a new chemical compound, tri-2-ethylhexyl phosphate.

2. As a new chemical compound, tri-2-ethylhexyl phosphate having a boiling point of about 203° C. at 3.5 mm. of mercury pressure, and a specific gravity of about 0.924 at 20°/20° C.

THOMAS F. CARRUTHERS.

Certificate of Correction

Patent No. 2,406,802.  September 3, 1946.

THOMAS F. CARRUTHERS

It is hereby certified that error appears in the printed specification of the above numbered patent requiring correction as follows: Column 1, line 9, for "Tri-2-methylhexyl" read *Tri-2-ethylhexyl*; and that the said Letters Patent should be read with this correction therein that the same may conform to the record of the case in the Patent Office.

Signed and sealed this 12th day of November, A. D. 1946.

[SEAL]

LESLIE FRAZER,
*First Assistant Commissioner of Patents.*